United States Patent
Tong

(10) Patent No.: US 6,613,473 B1
(45) Date of Patent: Sep. 2, 2003

(54) BATTERY WITH CYLINDRICAL CELLS

(76) Inventor: Leon Tong, 1032 E. Main St., Alhambra, CA (US) 91801

( * ) Notice: Subject to any disclaimer, the term of this patent is extended or adjusted under 35 U.S.C. 154(b) by 13 days.

(21) Appl. No.: 09/659,673

(22) Filed: Sep. 11, 2000

(51) Int. Cl.[7] ................................................. H01M 2/02
(52) U.S. Cl. ........................ 429/154; 429/163; 429/176
(58) Field of Search ................................ 429/149, 164, 429/176, 178, 148, 163, 153, 175, 94, 168, 151, 154

(56) References Cited

U.S. PATENT DOCUMENTS

| | | | |
|---|---|---|---|
| 3,794,525 A | 2/1974 | Kaye | |
| 3,887,394 A | 6/1975 | Kaye | |
| 4,091,187 A | 5/1978 | Kaye | |
| 4,123,598 A | 10/1978 | Hammel | |
| 4,190,702 A | 2/1980 | Pun et al. | |
| 4,259,416 A | 3/1981 | Ikeda et al. | |
| 4,394,059 A * | 7/1983 | Reynolds | ............... 439/500 |
| 4,663,247 A | 5/1987 | Smilanich et al. | |
| 4,920,019 A | 4/1990 | Stoklosa et al. | |
| 4,929,519 A | 5/1990 | Catotti | |
| 5,143,804 A * | 9/1992 | McArthur et al. | ............ 429/148 |
| 5,300,125 A | 4/1994 | Desai et al. | |
| 5,800,942 A | 9/1998 | Hamada et al. | |
| 5,879,831 A | 3/1999 | Ovshinsky et al. | |
| 6,051,336 A * | 4/2000 | Dougherty et al. | ........... 429/149 |
| 6,265,091 B1 * | 7/2001 | Pierson et al. | ................. 429/1 |
| 6,406,815 B1 * | 6/2002 | Sandberg et al. | ............ 106/417 |

* cited by examiner

Primary Examiner—Randy Gulakowski
Assistant Examiner—Monique Wills
(74) Attorney, Agent, or Firm—William R. Bachand; Squire, Sanders & Dempsey LLP

(57) ABSTRACT

A higher amp-hour capacity battery is formed in a conventional battery package by arranging cylindrical cells in a bundled configuration. A bundle of cylindrical cells, whether nonrechargeable or rechargeable may be less expensive to produce and may offer more desirable charge and discharge characteristics than other arrangements and cell geometries, even though some space in a resulting package is not occupied by cells. A rectangular 9-volt type battery may include seven cells wired in series and bundled horizontally or vertically inside the rectangular case.

15 Claims, 5 Drawing Sheets

VIEW A-A

VIEW B-B

BATTERY WITH CYLINDRICAL CELLS

FIELD OF THE INVENTION

Embodiments of the present invention relate to electrical batteries formed from multiple cylindrical cells.

BACKGROUND OF THE INVENTION

A conventional electrical battery may be used to power relatively small, lightweight, portable equipment and may itself consist of a series or parallel connection of cells. The design of particular batteries may conform to standard package dimensions such as the common AAA, AA, C, D, and miniature rectangular 9-volt sizes. In a conventional miniature rectangular 9-volt battery package with snap terminals, tub-shaped cells are typically arranged to occupy the entire volume of the package interior.

The useful life of battery operated equipment is primarily affected by the amp-hour capacity of the battery or the single cycle of a rechargeable battery. Further increase in amp-hour capacity is desirable and cannot be achieved without the present invention.

SUMMARY OF THE INVENTION

A battery according to various aspects of the present invention includes a retainer and a circuit. The circuit includes a plurality of cells retained in position by the retainer. The retainer provides a positive and a negative conductor to which all of the cells are coupled. When a dimension of the retainer must meet a predetermined maximum, a number of cells may be dictated by a desired cell chemistry and circuit arrangement (series, parallel, or combination series and parallel). When a bundle of cells of identical diameter is desired, the diameter of each cell of the bundle may be maximized so that the bundle snuggly fits within the retainer dimension.

By constraining all cells of the bundle to be of identical diameter, overall manufacturing costs for the battery may benefit from various economies of scale (e.g., unit costs for materials, subassemblies, and labor operations may decrease).

In an exemplary implementation, the retainer may provide an enclosure having a substantially hexahedral interior cavity and a cap through which a first and a second terminal pass current. A series circuit may include the first terminal, a plurality of cylindrical cells, and the second terminal. The cylindrical cells may be arranged in a bundle having all axes of cylindrical symmetry in parallel. All axes of cylindrical symmetry may pass through a plane that includes the terminals. Or, all axes may be substantially parallel to such a plane. By arranging a bundle of cylindrical cells inside a hexahedral cavity, cylindrical cell geometry may provide better discharge or charge characteristics compared to a plurality of close-packed tub-shaped cells as well as lower cost of manufacture, higher reliability, better seal stability, and more uniform unit-to-unit characteristics.

In another implementation, the battery includes an enclosure that supports at least one battery terminal and a vent formed in the battery terminal. The terminal may include a hollow rivet that provides an aperture. The vent may include a filter over the aperture, for example, a sheet of porous foam. Filtered ambient air may pass into the enclosure and discharged vapor from any cell may pass out of the enclosure.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

A battery, according to various aspects of the present invention, provides an output voltage (or current) that includes a multiple of a cell voltage (or current) when a plurality of identical cells are connected in series (or parallel). The plurality of cells are bundled in close-packed arrangement to snuggly fit against a retainer. The retainer may provide an enclosure, substantially surrounding the bundled cells, with a cap that may be vented to balance air pressure between the interior and the exterior of the enclosure. Any number of cells may be bundled. In a preferred implementation, identical cylindrical cells are bundled.

Figure 1:
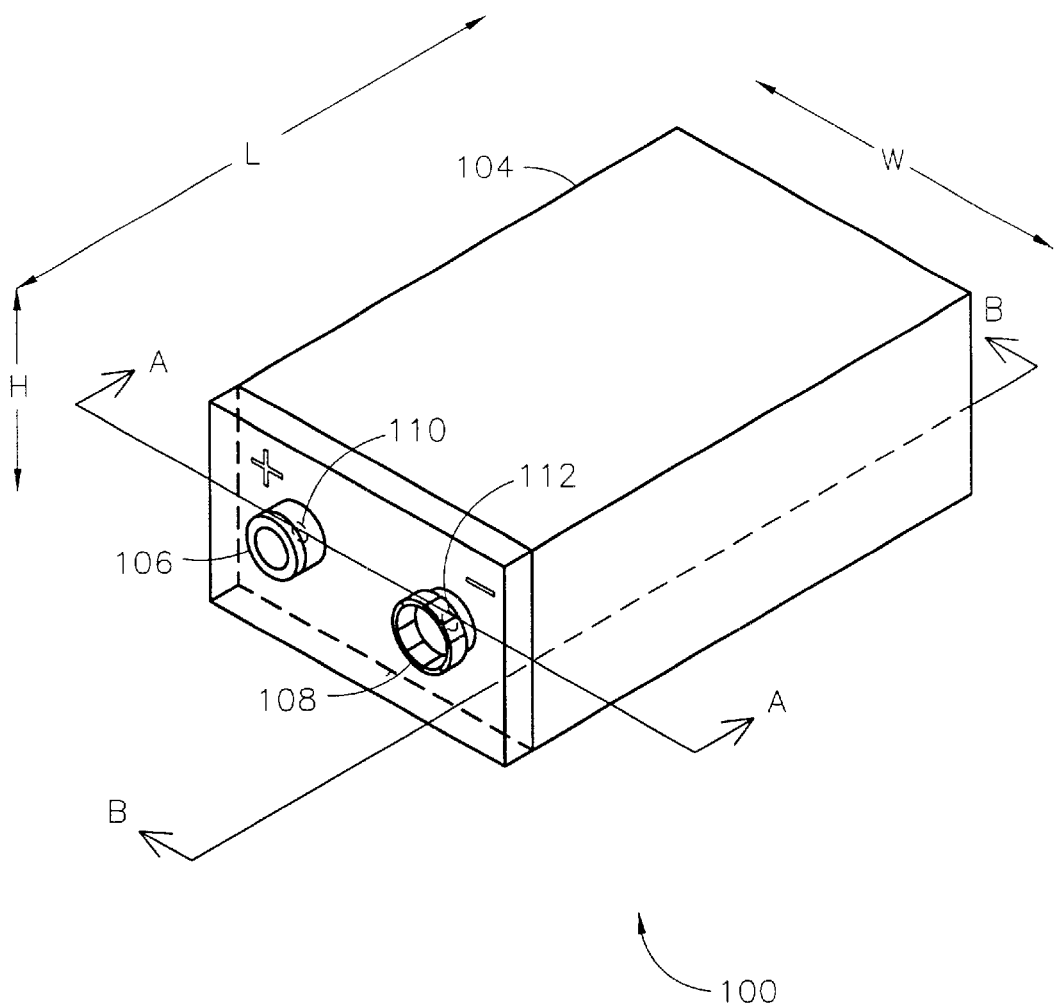
FIG. 1 is a perspective view of a battery according to various aspects of the present invention.
Figure 2:
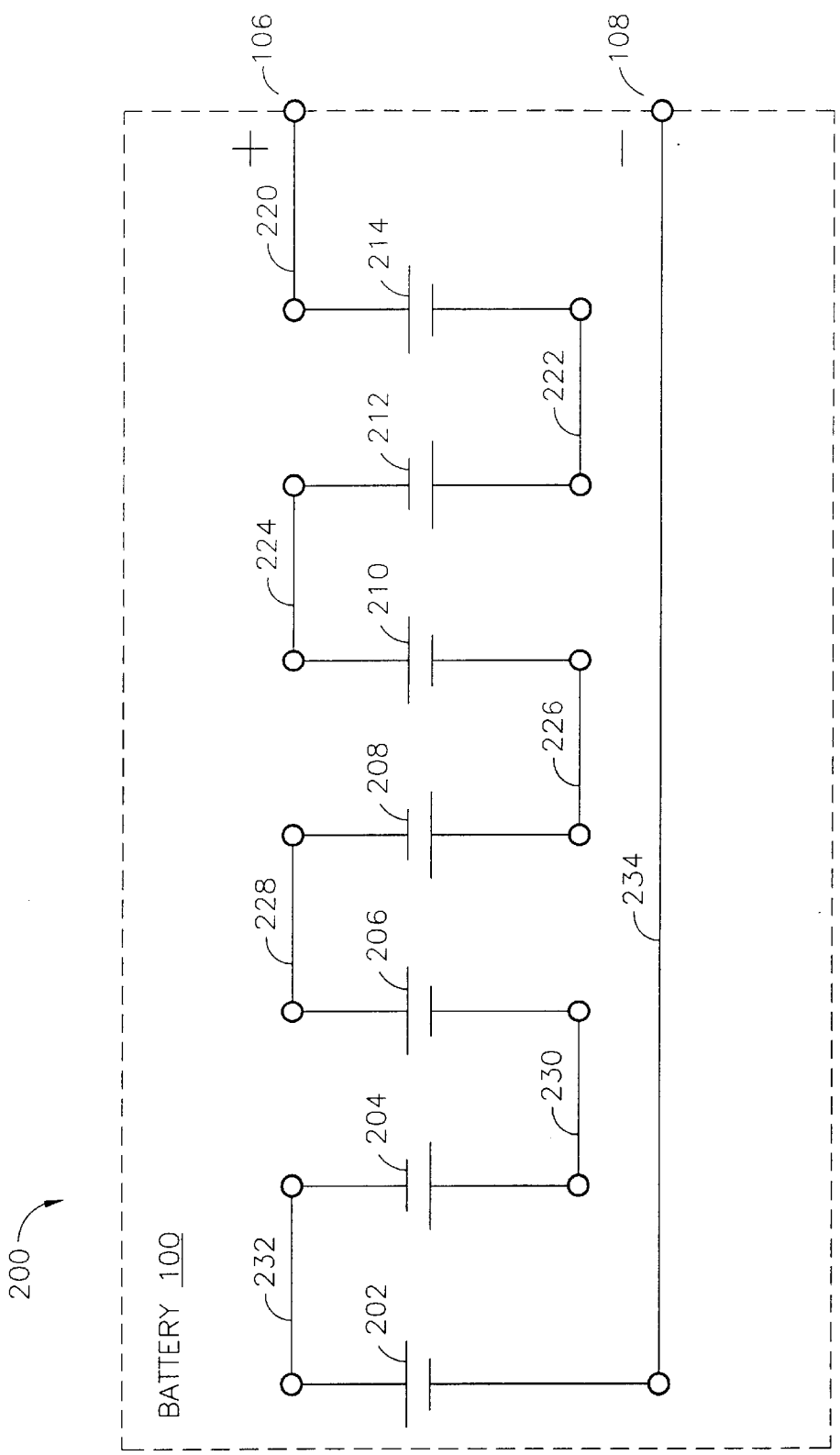
FIG. 2 is an electrical schematic diagram of the battery of FIG. 1.

For example, battery 100 of FIG. 1 includes case 102, cap 104, positive terminal 106, and negative terminal 108. Negative terminal 108 includes vent 110 mounted coaxially in terminal 108. Battery 100 may conform to industry standard dimensions for length, width, height, and terminal shape and dimensions. For example, battery 100 may conform to the standard dimensions of a conventional nominal 9-volt type battery with snap terminals. In one implementation of a nominal 9-volt type battery, according to various aspects of the present invention, seven cells each having chemistry to provide about 1.2 volts are coupled in a series circuit. An exemplary series circuit (e.g., schematic 200 of FIG. 2) includes seven identical cells 202, 204, 206, 208, 210, 212, and 214 coupled in series between terminals 106 and 108. Cells may be electrically coupled by links 220, 222, 224, 226, 228, 230, 232, and 234. Cell chemistry and the series circuit provide an output voltage across terminals 106 and 108 of about 8.4 volts which is considered satisfactory for a nominal 9-volt type battery.

Figure 3:
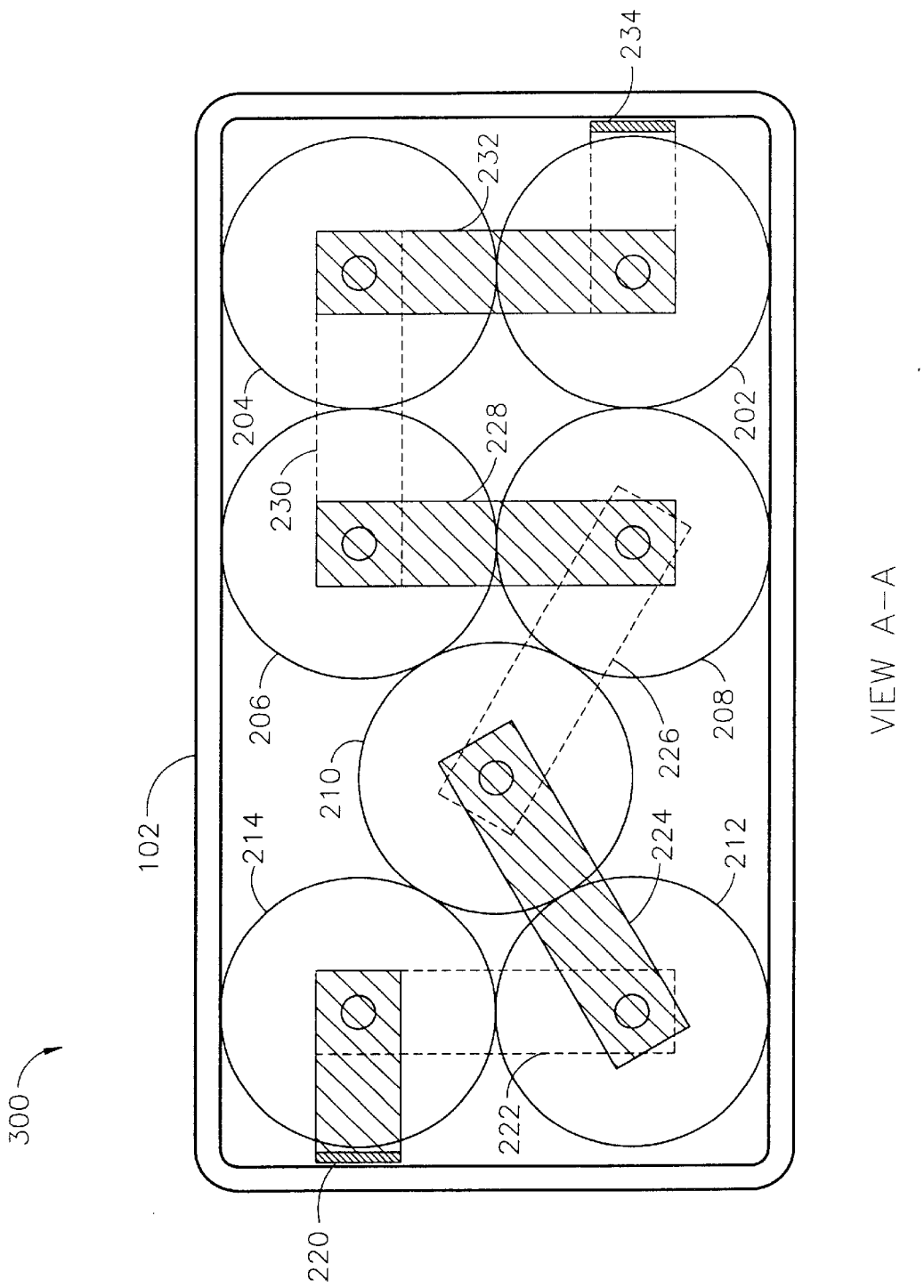
FIG. 3 is a cross-sectional view of the battery of FIG. 2 in a first implementation.

Cylindrical cells may be arranged with respective axes of cylindrical symmetry oriented parallel to the longest dimension of the retainer. For example, arrangement 300 of FIG. 3 provides one bundle of seven identical cylindrical cells 202, 204, 206, 208, 210, 212, and 214 each having an axis of cylindrical symmetry parallel to dimension L of case 102 and electrically connected according to schematic 200. A cell diameter approximately one-half of the shortest dimension H of the interior cavity of case 102 is preferred. A cell length approximately the dimension L of the interior cavity of the case 102 is preferred.

Figure 4:
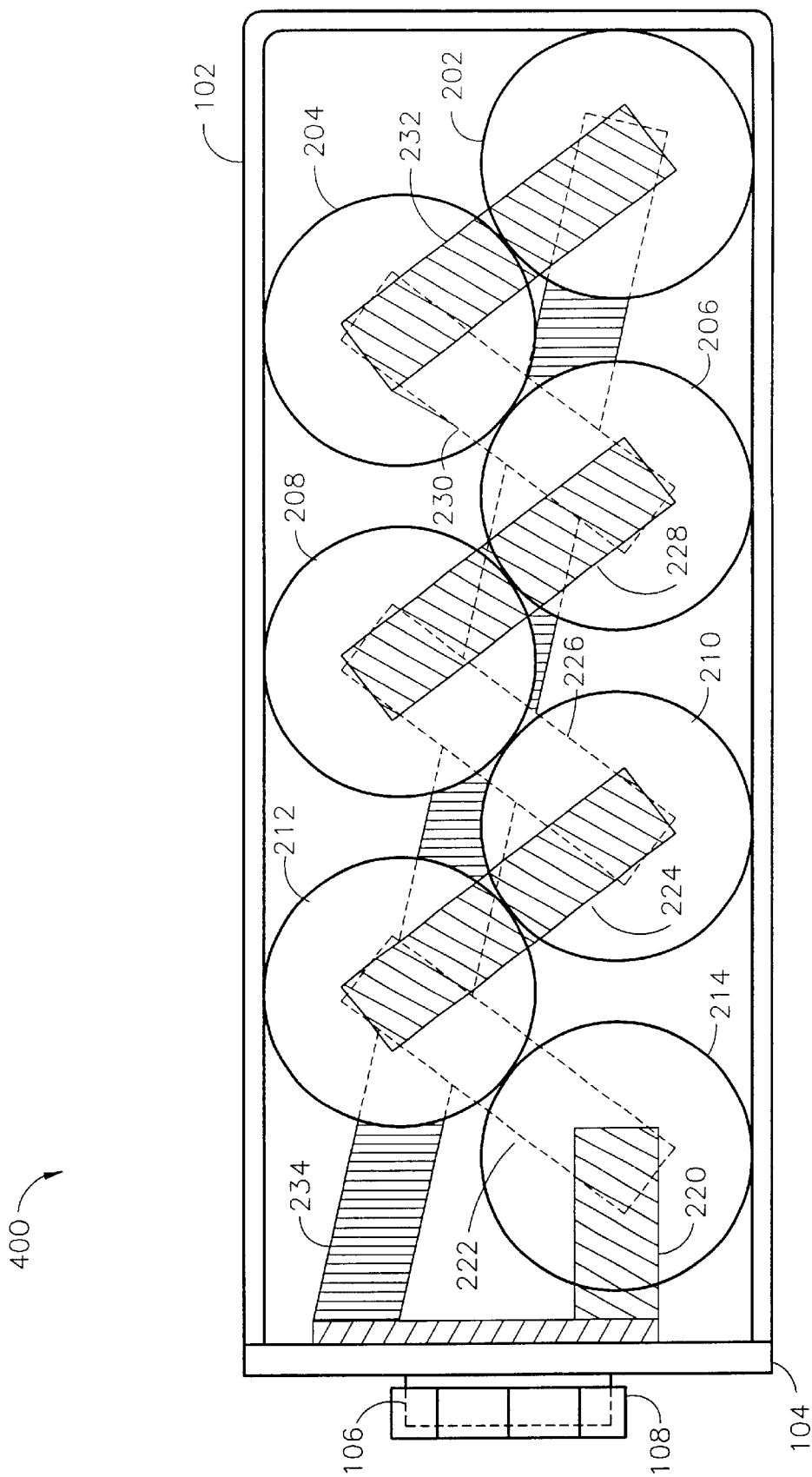
FIG. 4 is a cross-sectional view of the battery of FIG. 2 in a second implementation.

Cylindrical cells may be arranged with respective axes of cylindrical symmetry oriented parallel to a plane that includes the battery terminals. For example, battery 100 has terminals 106 and 108 located in a plane that includes a surface of cap 104. Arrangement 400 of FIG. 4 provides one bundle of seven identical cylindrical cells 202, 204, 206, 208, 210, 212, and 214 each having an axis of cylindrical symmetry parallel to that plane (e.g., parallel to axis AA of FIG. 1) and electrically connected according to schematic 200. A cell length approximately equal to the dimension W of the interior cavity of case 102 is preferred.

A preferred cell diameter is selected to close pack the desired number of cells into the interior cavity of case 102.

For example, in the arrangement in FIG. 3, a portion of the length of each cell abuts at least two other cells and (except for cell 210) abuts a portion of the interior cavity of case 102. In another implementation, passage of links 220 and 234 along the length of a cell between the cell and the interior side wall is avoided. Cell diameters may then be used so that all cells contact one or more interior surfaces of the cavity except one (e.g., cell 210 in FIG. 3). In the arrangement in FIG. 4, each cell of a majority of cells abuts two other cells and abuts an interior surface of the cavity.

Cell terminals may be electrically coupled to battery terminals in series. For example, links 222, 224, 226, 228, 230, and 232 are identical in dimensions, formed of plated copper or steel sheet material, and are spot welded at each respective end of the link to a cell terminal. Link 234 may be formed of similar material, spot welded to cell 202, insulated on one or all sides to avoid electrical contact with other links and cells, and be connected to one of the battery terminals, (e.g., negative terminal 108). Connection to a battery terminal may be made in any conventional manner, for example, with a rivet that concomitantly binds terminal 108 to cap 104.

Figure 5:
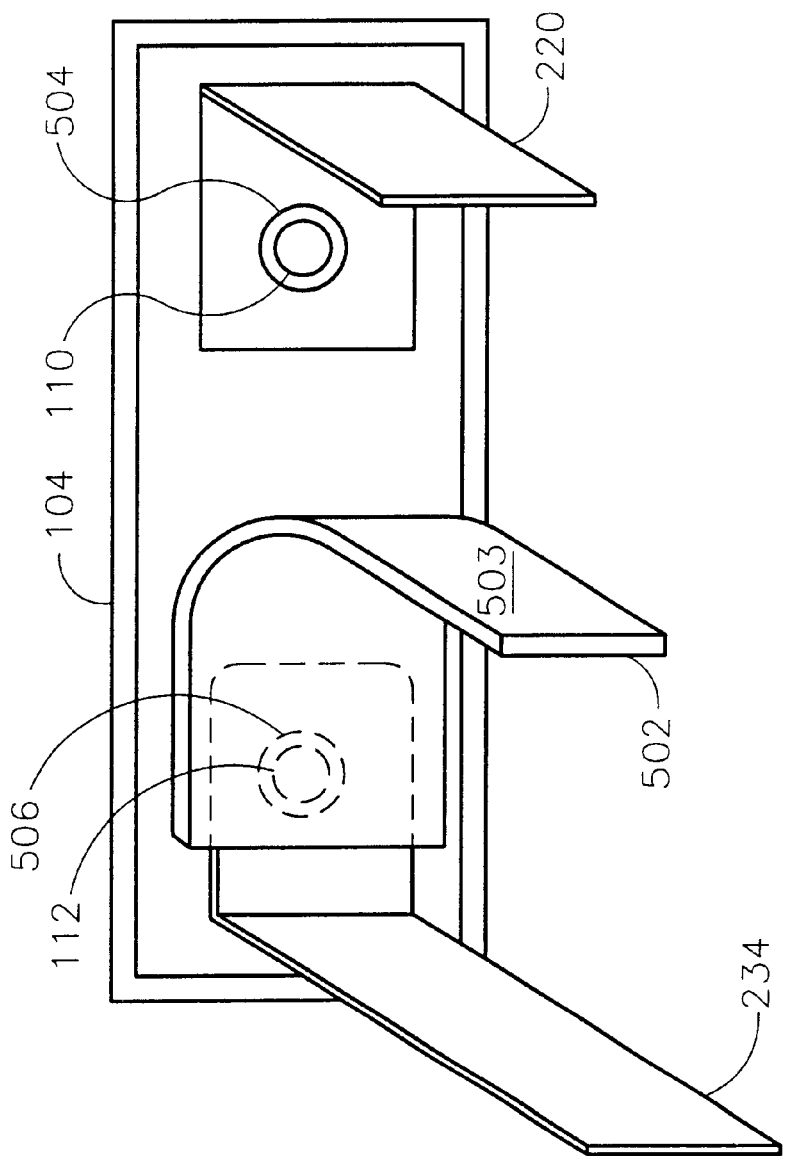
FIG. 5 is a perspective view of the rear of the cap of the battery of FIG. 1.

Battery 100 may include conventional snap terminals (e.g., of the type common to 9-volt nominal battery packages). For example, cap 104 of FIG. 5 includes hollow rivets 504 and 506 respectively securing links 220 and 234, through holes in cap 104, to male and female snap terminals 106 and 108 (not shown in FIG. 5). Each hollow rivet defines an aperture 110 and 112 through which pressure equalization may occur between ambient air external to the enclosure (formed by cap 104 suitably affixed in any conventional manner as an air-tight seal to case 102) and air internal to the enclosure. A filter may cover apertures 110 and 112 to limit contamination of the interior of the enclosure by airborne particulates or fluids (e.g., condensation). For example, foam sheet 502 serves as a filter and provides mechanical cushioning between cap 104 and cells of battery 100. Foam sheet 502 may include any conventional adhesive applied to at least a portion of surface 503 to maintain position of foam sheet 502 over apertures 110 and 112 (e.g., adhering sheet 502 to cap 104) without occluding airflow through apertures 110 and 112.

Any suitable internal dimensions, structure, and chemical composition may be used for each cell. For example, any conventional cell structure and composition may be used. A rechargeable chemistry (e.g., nickel-cadmium) is preferred. Cells 202, 204, 206, 208, 210, 212, and 214 may be of various types (dissimilar or identical to each other) including cells of the type described in U.S. Pat. No. 4,259,416 to Ikeda; U.S. Pat. No. 4,663,247 to Smilanich; and U.S. Pat. No. 4,929,519 to Catotti, each incorporated herein by this reference.

Particular synergies are realized in the present invention by employing high energy density cylindrical cells for batteries. A battery according to various aspects of the present invention may have an overall geometry (established by the retainer or enclosure) that is cylindrical (e.g., bundled parallel 1.2 volt cells in a conventional AAA, AA, C, or D battery package) or noncylindrical (e.g., cubic, prismatic, or hexahedral) and either regular in geometry (having several pairs of equal dimensions) or irregular.

For a battery that includes a retainer that encloses one or more cells, the enclosure may include any suitable vent. When supported within an enclosure and exposed to heat, individual cells may release vapor pressure into the enclosure (e.g., case 102 closed with cap 104). For example, as discussed above, battery 100 may include one or more vents in cap 104 (preferably coaxial with a terminal). Such a vent may be of the type described in U.S. Pat. No. 5,879,831 to Ovshinsky, incorporated by this reference along with all patents referred to therein.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A battery comprising:
    a. a case comprising a body and a cap, the body having a substantially hexahedral interior cavity, the cap comprising a first terminal and a second terminal, each terminal providing electrical conduction through the cap; and
    b. a plurality of seven cylindrical rechargeable cells arranged within the cavity, wherein
    c. one cell of the plurality abuts each of four cells of the plurality; and
    d. the cells of the plurality are coupled between the first and second terminals in a series circuit for operation as a battery.

2. The battery of claim 1 wherein the cavity has at least one plane boundary; and each cell has a respective axis of cylindrical symmetry that passes through the plane.

3. The battery of claim 1 wherein the cavity has at least one second plane boundary, a first terminal, and a second terminal, wherein the first terminal and the second terminal pass current through the second plane.

4. The battery of claim 1 wherein the plurality comprises seven cells.

5. The battery of claim 4 wherein the nominal voltage between the first and the second terminal is in the range from about 8.0 volts to 10.0 volts.

6. A battery comprising:
    a. a retainer having a substantially hexahedral interior cavity; and
    b. a plurality of cylindrical cells arranged within the cavity, the cells coupled in a circuit for operation as a battery; wherein:
        (1) the cavity has a first interior surface and a second interior surface, the first surface being parallel to the second surface;
        (2) a first, a secondhand a third cell of the plurality each has a respective outer surface;
        (3) the outer surface of the second cell is in contact with the respective outer surfaces of the first and third cells and in contact with the first interior surface; and
        (4) the outer surface of the first and the third cells is in contact with the second interior surface.

7. The battery of claim 1 wherein:
    a. the cap being sealed to the body at an interface to prevent airflow via the interface; and
    b. the first terminal comprises a vent that permits gaseous communication between the cavity interior and ambient atmosphere.

8. The battery of claim 1 wherein:
    a. the case has a length, a width, and a height, in a Cartesian coordinate system, the width and the height defined in a plane through which the first and second terminals provide conductivity through the cap; and b. each cell of the plurality has an axis of cylindrical symmetry parallel to the length.

9. The battery of claim 5 wherein the retainer further comprises a plurality of snap terminals.

10. The battery of claim 1 wherein the first terminal comprises a snap terminal and the second terminal comprises a snap terminal.

11. The battery of claim 1 wherein each cell of a majority of cells of the plurality further abuts an interior surface of the cavity.

12. The battery of claim 6 wherein:

a. the retainer further comprises a body and a cap, the cap being sealed to the body at an interface to prevent airflow via the interface; and b. the cap comprises a terminal coupled to the circuit, the terminal having a vent that permits gaseous communication between the cavity interior and ambient atmosphere.

13. The battery of claim 6 wherein a diameter of a cell of the plurality of cells is less than or equal to one-half of a shortest interior dimension of the cavity.

14. The battery of claim 1 wherein a diameter of a cell of the plurality of cells is less than or equal to one-half of a shortest interior dimension of the cavity.

15. The battery of claim 6 wherein the plurality consists of seven cells.

* * * * *